INVENTOR.
KENT W. HEMPHILL
BY Anthony D. Cennamo
Daniel Rubin
ATTORNEYS

Oct. 14, 1969 K. W. HEMPHILL 3,472,136

CHARACTER GENERATOR

Filed July 5, 1966 5 Sheets-Sheet 2

INVENTOR.
KENT W. HEMPHILL

BY Anthony D. Cennamo
Daniel Rubin

ATTORNEYS

Oct. 14, 1969 K. W. HEMPHILL 3,472,136

CHARACTER GENERATOR

Filed July 5, 1966 5 Sheets-Sheet 3

INVENTOR.
KENT W. HEMPHILL

BY Anthony D. Cennamo
Daniel Rubin
ATTORNEYS

INVENTOR.
KENT W. HEMPHILL
BY Anthony D. Cennamo
Daniel Rubin
ATTORNEYS

INVENTOR.
KENT W. HEMPHILL
BY Anthony D. Cennamo
Daniel Rubin
ATTORNEYS 3,472,136
Patented Oct. 14, 1969

3,472,136

CHARACTER GENERATOR

Kent W. Hemphill, Rochester, N.Y., assignor to Xerox Corporation, Rochester, N.Y., a corporation of New York Filed July 5, 1966, Ser. No. 562,892
Int. Cl. G03b *17/24, 27/52*
U.S. Cl. 95—1.1 7 Claims

ABSTRACT OF THE DISCLOSURE

Apparatus is provided employing xerographic techniques for recording reference information onto a receiving web such as microfilm. The recording reference information is supplied from a character generator which generates characters in numerical relation and at predetermined intervals on prearranged marking areas of the receiving web.

This invention relates to character generator apparatus adapted to project reference coding information onto a recording surface. More specifically it relates to character generator apparatus adapted for recording coding information onto prearranged areas of web materials, such as microfilm.

This country is undergoing an information explosion as has never before been experienced. An important aspect of this information explosion is the demand for a satisfactory storage and retrieval system for this information. Of all the ways in which information can be stored and retrieved, microfilm is by far the most common. Indeed, most libraries have a section devoted exclusively for microfilm readout where such items as newspapers, periodicals, and texts may be observed through an optical viewer. An existing problem in the use of microfilm is the titling or identification of particular film frames on a film roll. This problem is particularly noteworthy where the image frames do not contain numerals or dates and ready identification can only be made by observing the image as a whole. Needless to say this procedure can be laborious and time consuming.

The present invention enables recording reference information in numerical or other suitably understood sequence onto a receiving web having prearranged marking areas, such as, adjacent image frames on microfilm. Generally speaking this is accomplished by xerographically recording reference information supplied from the novel character generator hereof which generates characters in numerical relation at a high level of illumination and readability. More than this, the character generator provides the reference information at a predetermined interval whereby the information can be recorded precisely in the prearranged marking areas on the receiving web.

It is therefore an object of this invention to provide a novel character generator adapted for supplying reference information to an imaging plane.

It is a further object of this invention to provide novel imaging apparatus capable of continuously projecting at least five digits or characters in related sequence for imaging at a high level of illumination with a high degree of readability.

It is still a further object of this invention to provide a novel system for titling image frames of preprocessed microfilm in numerical sequence.

These and other objects will become apparent in connection with the subsequent description and the drawings in which.

Figure 1:
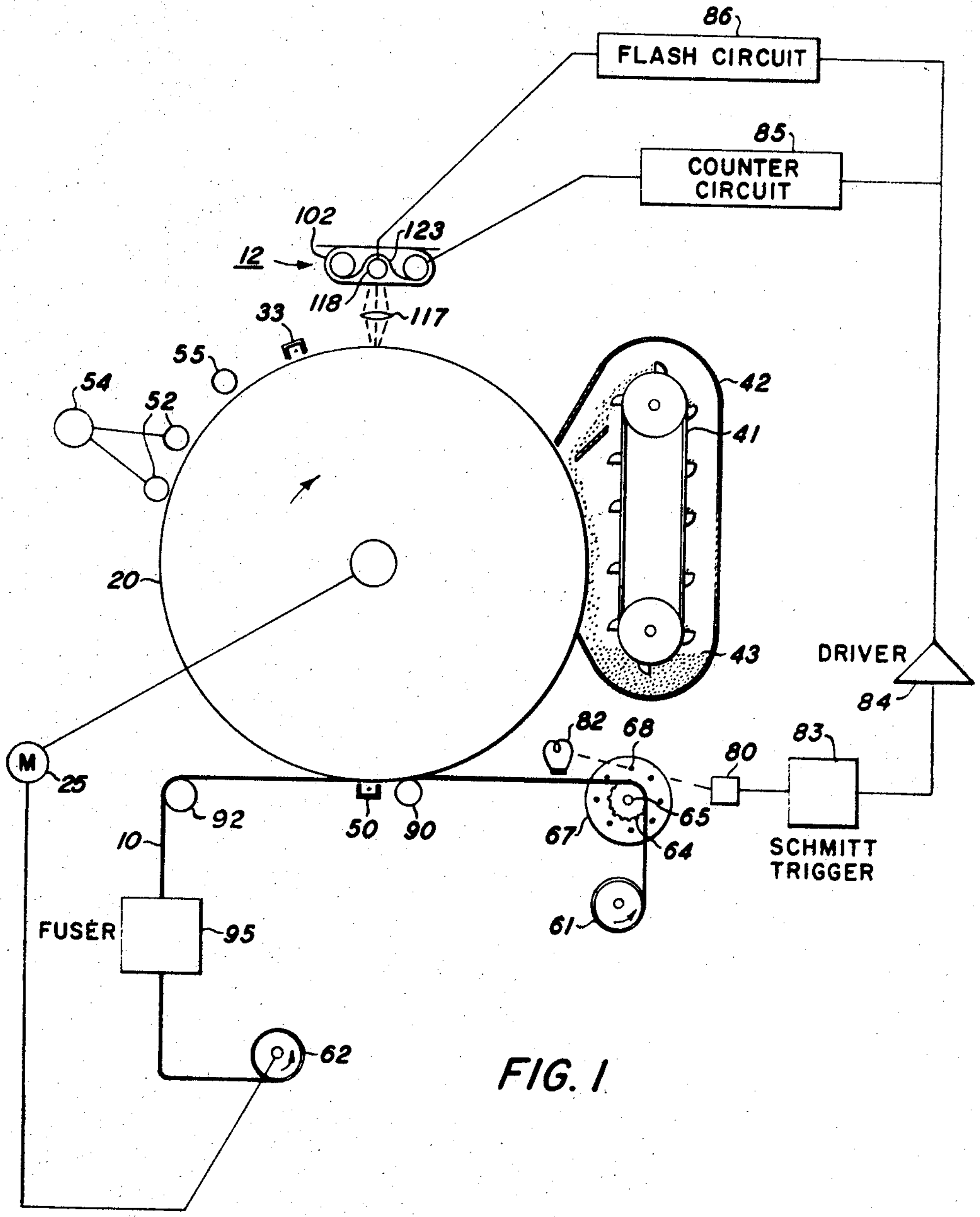
FIG. 1 is a schematic sectional view of a drum type xerographic machine illustrating a preferred embodiment of the present invention.

Referring now to FIG. 1, there is shown a schematic sectional view of a drum type xerographic apparatus which although not intended as a limitation is a preferred embodiment for utilizing a character generator according to the present invention. As employed here the purpose of the xerographic apparatus is to record reference information, such as, numerals in prearranged marking areas on a web of microfilm 10 sequentially in counter-like fashion thereby identifying film frames on the microfilm. Although reference is made to both numerals and microfilm, it is not intended to be restricted to this combination. Thus, web 10 could comprise paper or the like on which alphanumeric or other suitable information is to be recorded.

Xerographic drum 20 is coated on its outer surface with a layer of photoconductive insulating material, such as, vitreous selenium and rotated about its axis in the direction of the arrow by a synchronous motor 25 past a series of xerographic processing stations. Motor 25 also drives the transport assembly 30 of microfilm web 10 on which information is to be recorded whereby the movement of the drum 20 and the web 10 are at all times in synchronization.

To place initial charge on the photoconductive surface of drum 20 there is a charging apparatus 33 which may be a corona discharge array of one or more corona discharge electrodes that extend transversely across the drum surface and are energized from a high potential source as described in U.S. Patent 2,777,957.

Next after projecting characters supplied by a character generator 12 in accordance with the present invention as will be described later latent images formed on the drum surface are advanced past development apparatus including a bucket conveyor 41 operating in a housing 42. Conveyor 41 lifts developer material 43 from a supply at the bottom of the housing 42 to a point above drum 20 and then releases the developer onto drum 20 over which the developer material cascades returning to the bottom of housing 42. The developer material 43 comprises powder or toner mixed with a granular "carrier" material, as described in U.S. Patent 2,618,551. As developer material 43 cascades over drum 10, its outer toner particles are selectively detached from the "carrier" particles and deposit onto the surface in accordance with the latent images thereon thus forming visible images.

Subsequent to development, the developed images are transferred from the drum 20 to web 10 by means of a second corona charging device 50 similar to corona charging device 33. After transfer, the drum is cleaned by a pair of cleaning brushes 52 driven by a motor 54. A source of illumination 55 dissipates any residual charge on the drum prior to commencing the next cycle.

To advance web 10 for receiving the developed images in prearranged marking areas thereon the transport assembly 30 comprises a supply spool 61 from which the web is fed onto a takeup spool 62. Takeup spool 62 which is driven by motor 25 is provided with a suitable slip clutch to maintain proper tensioning of the web at all times. Web 10 is advanced first over a sprocket 64 mounted on a rotatable shaft 65 which also carries a timing disc 67 by which the timing of the exposure from character generator 12 can be synchronized with the advancing web. Timing disc 67 has a plurality of apertures 68 having radial spacing corresponding to the distance between image frame marking areas on microfilm web 10. A sync signal is generated from photocell 80 positioned to receive illumination from a lamp 82 through the radially spaced apertures 68 in the timing disc. The signals emitted are supplied first to a Schmitt trigger 83 for squaring and then to a power driver 84 before being introduced to a character selector circuit 85 and a flash circuit 86 for imaging reference character information onto drum 20 to be described more fully hereinafter. After passing over sprocket 64 web 10 is advanced into pressure contact with the drum 10 with the aid of a pressure roller 90 where the xerographic image on drum 10 is transferred to the web as previously described. Web 10 is then advanced over an idler roller 92 before passing through a fuser 95 for fixing the image to the web. Any suitable fusing apparatus may be used, such as, by vapor as described in U.S. Patent 3,132,047 or a suitable heating element.

Figure 2:
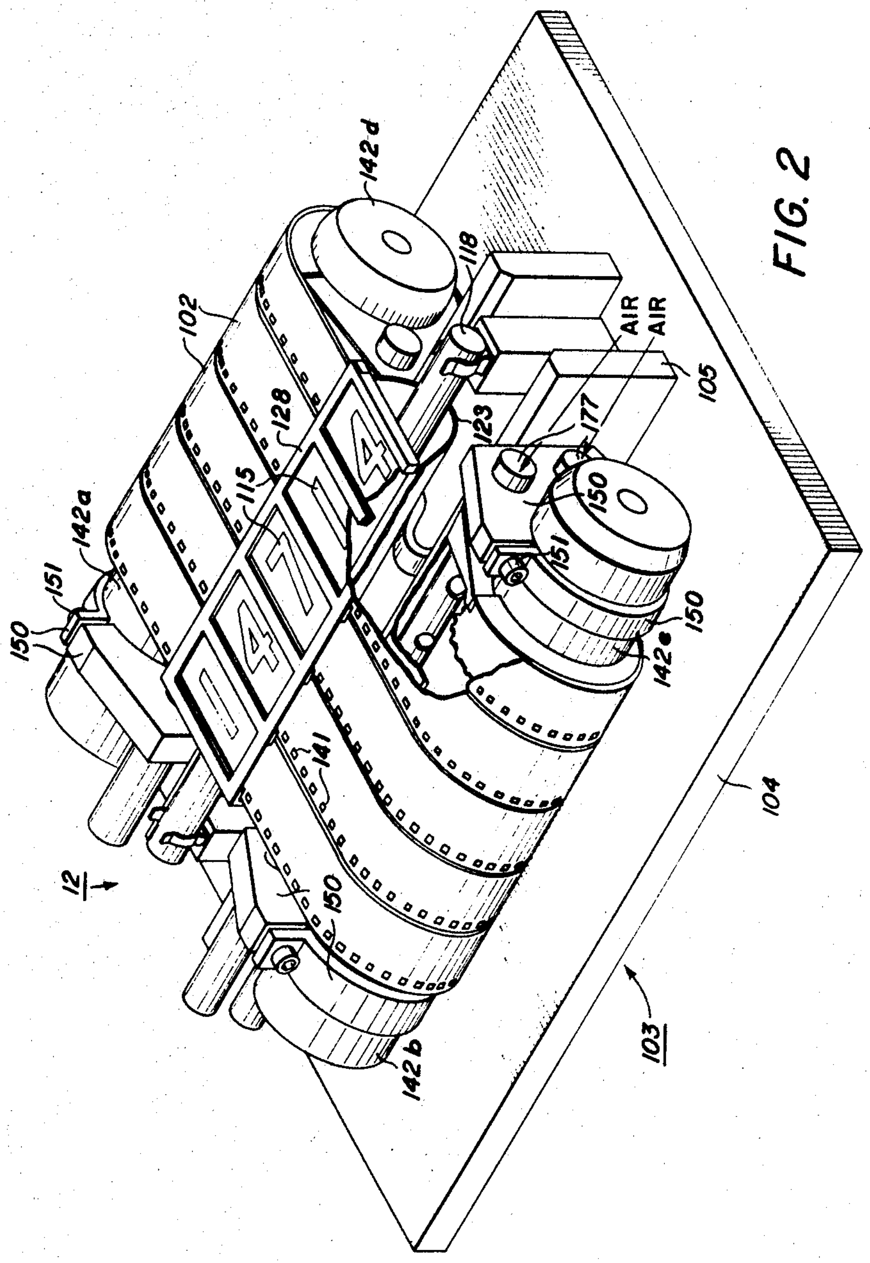
FIG. 2 is an isometric view of the character generator hereof.
Figure 3:
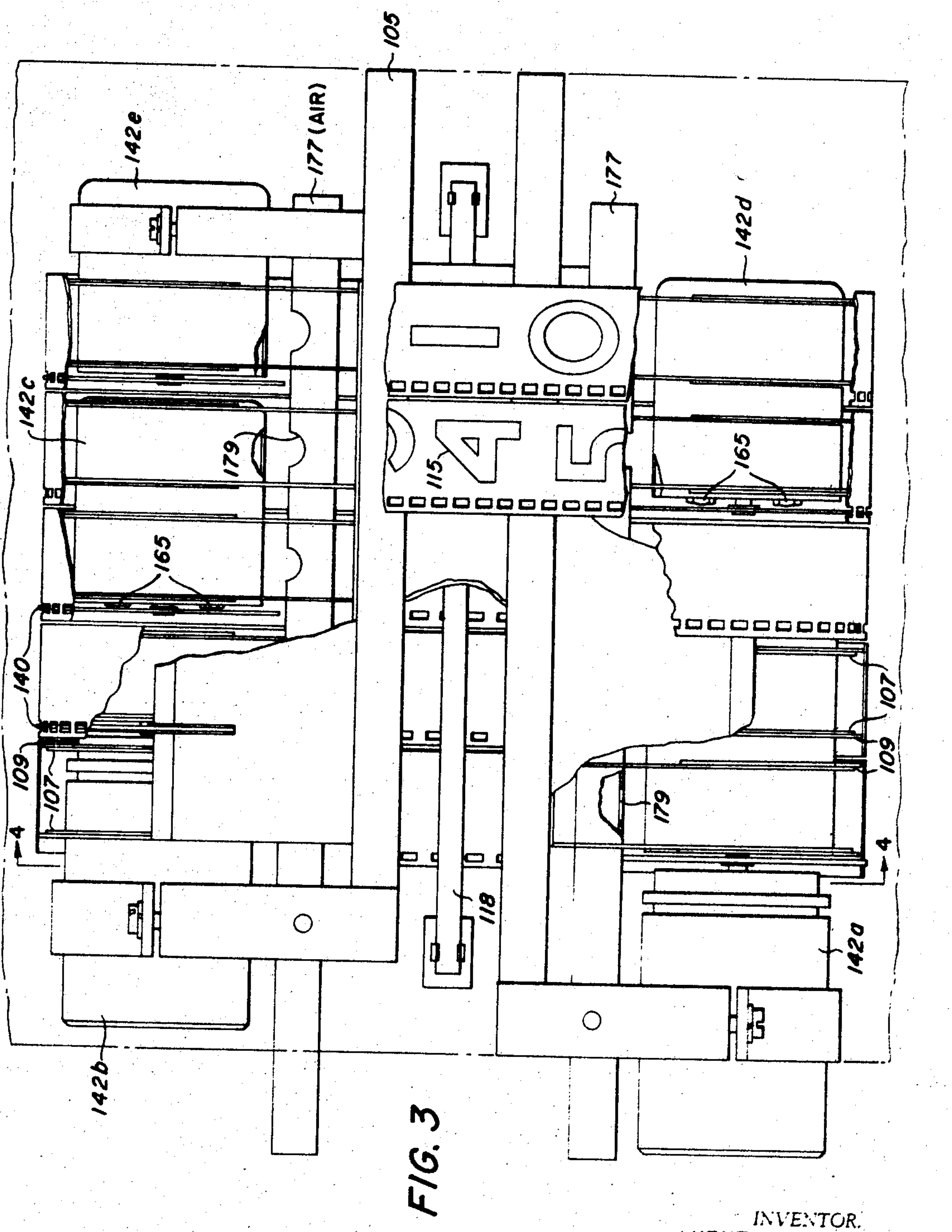
FIG. 3 is a sectional plan view of the character generator.
Figure 4:
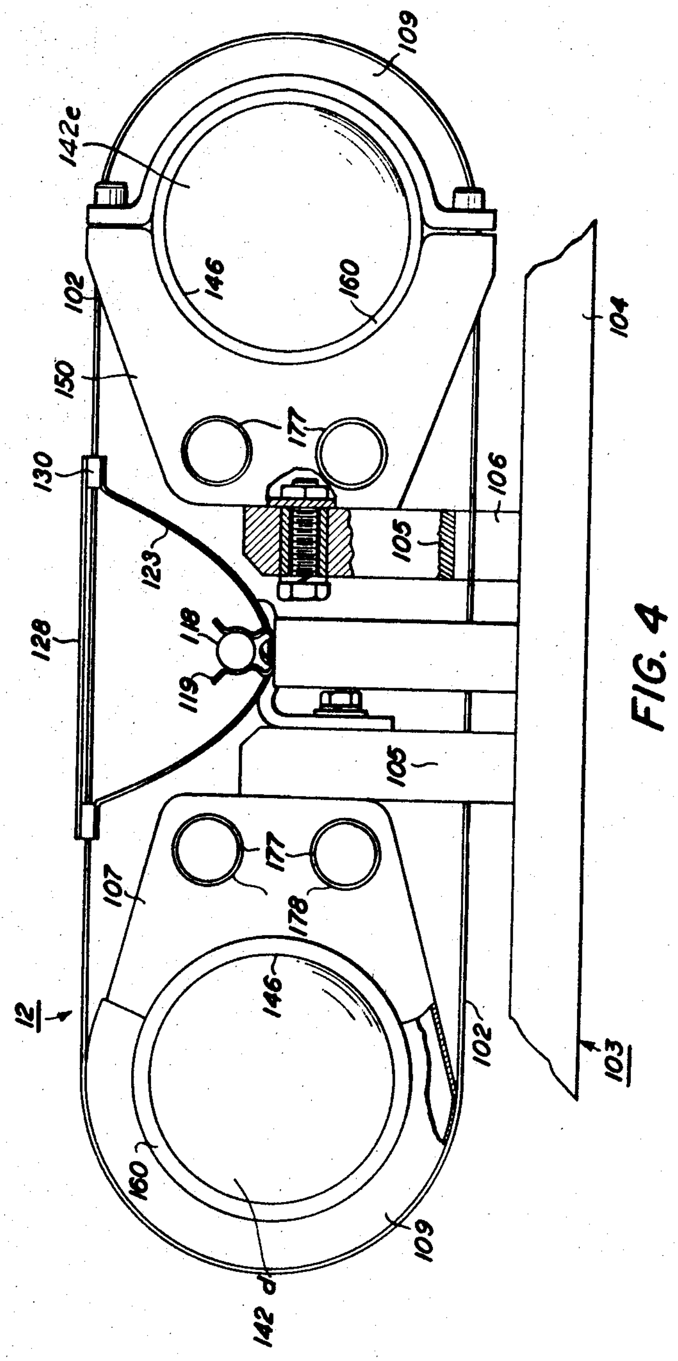
FIG. 4 is a side sectional view of the character generator taken along lines 4—4 of FIG. 3.

FIGS. 2–4 show the details of the character generator 12 which comprises a plurality of juxtaposed endless film loops 102 each separately movable and all supported on a frame generally designated 103. Frame 103 comprises a base 104 which supports a pair of parallel spaced apart plates 105 along the length thereof. Plates 105 have opposite openings 106 (see FIG. 4) to allow film loops 102 to pass through freely.

Loops 102 are positioned about transversely extending brackets 107 to which are fixed fins 109 shaped to the form of the loop ends. Fins 109 are made from Teflon (tetrafluoroethylene) so that friction generated by contact between the loop ends and fins 109 is kept at a minimum due to the lubricating characteristics of this material. Brackets 107 are secured to plates 105 in any suitable manner, such as, by nut and bolt pairs 110 (see FIGURE 4).

Each film loop 102 contains transparent numerals 115 ranging from "0" to "9." Numerals 115 have a high coverage aspect on the film loop 102, i.e. the width of numerals 115 is substantially the same as loop 102. The purpose for this is so that when the numerals are optically reduced by a lens 117 (see FIG. 1) for projection onto the surface of drum 20, a high level of readability is effected which is maintained when the information is subsequently transferred to web 10. It should be noted that the marking area available on web 10 for the recording of information is normally minute, for example, 2 mm. x 6 mm., and that maximum coverage of this area is desirable to facilitate readability. To minimize unused space, film loops 102 are spaced as closely as possible thereby enhancing the high area coverage aspect ultimately desired on web 10. Although only five loops are shown, this is only for purposes of illustration and more or fewer film loops can be used as desired. With five loops it is possible to generate numerals as high as the "ten thousandths" which is usually considered sufficient for a particular microllm titling.

Disposed inside of loops 102 and extending transverse to their path of movement is a flash lamp 118, as, for example, General Electric FT–77. Lamp 118 is inserted in a pair of end clips 119 that are supported by insulating blocks 121 extending from base 104. Partially enclosing lamp 118 to maximize illumination directed toward drum 20 is a parabolic reflector 123 which is secured to a one of plates 105 by one or more angle brackets 125. The outer limits of reflector 123 together with a mask 128 define an aperture at which the particular numeral is positioned at the time of projection. Guide strips 130 are secured to parabolic reflector 123 to maintain a fixed spacing between the loops.

Drive for the different film loops 102 is furnished by sprockets 140 which positively engage sprocket apertures 141 extending along the film edge thereby advancing film loops 102 along their defined paths past flash lamp 118. Drive sprockets 140 are driven by corresponding film loop drive motors designated as **142*a*, 142*b*, 142*c*, 142*d*, and 142*e*. In a preferred embodiment drive motors 142*a* and 142*b* for the "units" and "tens" digits are of the permanent magnet stepper motor type, since the higher stepping rates characteristic of these motors is well suited to the requirements of rapidly changing numerals. Drive motors 142*c*, 142*d*, and 142*e*** are of the rotary solenoid type which stop after a predetermined rotation corresponding to the advance of one digit. Stepper motors inherently require continuous power whereas solenoid type motors require power only during the actuating stroke which is relatively infrequent for the "hundreds," "thousands," and "ten thousandths" digits. Thus both types are utilized in the preferred mode of operation. It should be understood, however, that any suitable motor drive can be employed.

Motors **142*a*** through *e* are received through aligned openings 146 in support brackets 107. Stepper motors **142*a* and 142*b* are secured to the base 104 by clamps 150 and tie-bolts 151. Motors 142*c* and 142*d* which are smaller than the stepper motors are enclosed in sleeve members 160 that are positioned within openings 146 in brackets 107. These motors are fixed in place by nut and bolt assemblies 165 secured to brackets 107 (see FIG. 3). End motor 142*e* is also received in a sleeve member 160 which is conveniently clamped to base 104. Sleeve members 160 also serve to fill voids in the loop ends where no motor exists. The sleeve members are segmented to allow clearance for sprockets 140 which drive film loops 102**.

To effect predetermined tensioning of the film loops 102 during transport a plurality of air manifolds 177 are provided for supplying a continuous circulation of refrigerated or ambient air in the vicinity of the film loop ends. Air manifolds 177 are received through small openings 178 contained in brackets 107. Spaced along each air manifold 177 are one or more air discharge orifices 179 facing toward sleeves 160 and the end drive motors **142*a* and 142*b* (see FIGURE 4). Brackets 107 together with sleeves 160**, the end drive motors and film loop ends define cavities into which pressurized air can be received. The air escapes past the loosely fitting film loops while the pressure effect forms a cushion acting to maintain the film loops expanded at a predetermined tension. As can readily be appreciated, this cushion desirably forms an air bearing resulting in minimum frictional contact between the moving film loops and fins to protect the sensitive film surface from damage. The air also serves to prevent the motors and film from overheating.

Figure 5:
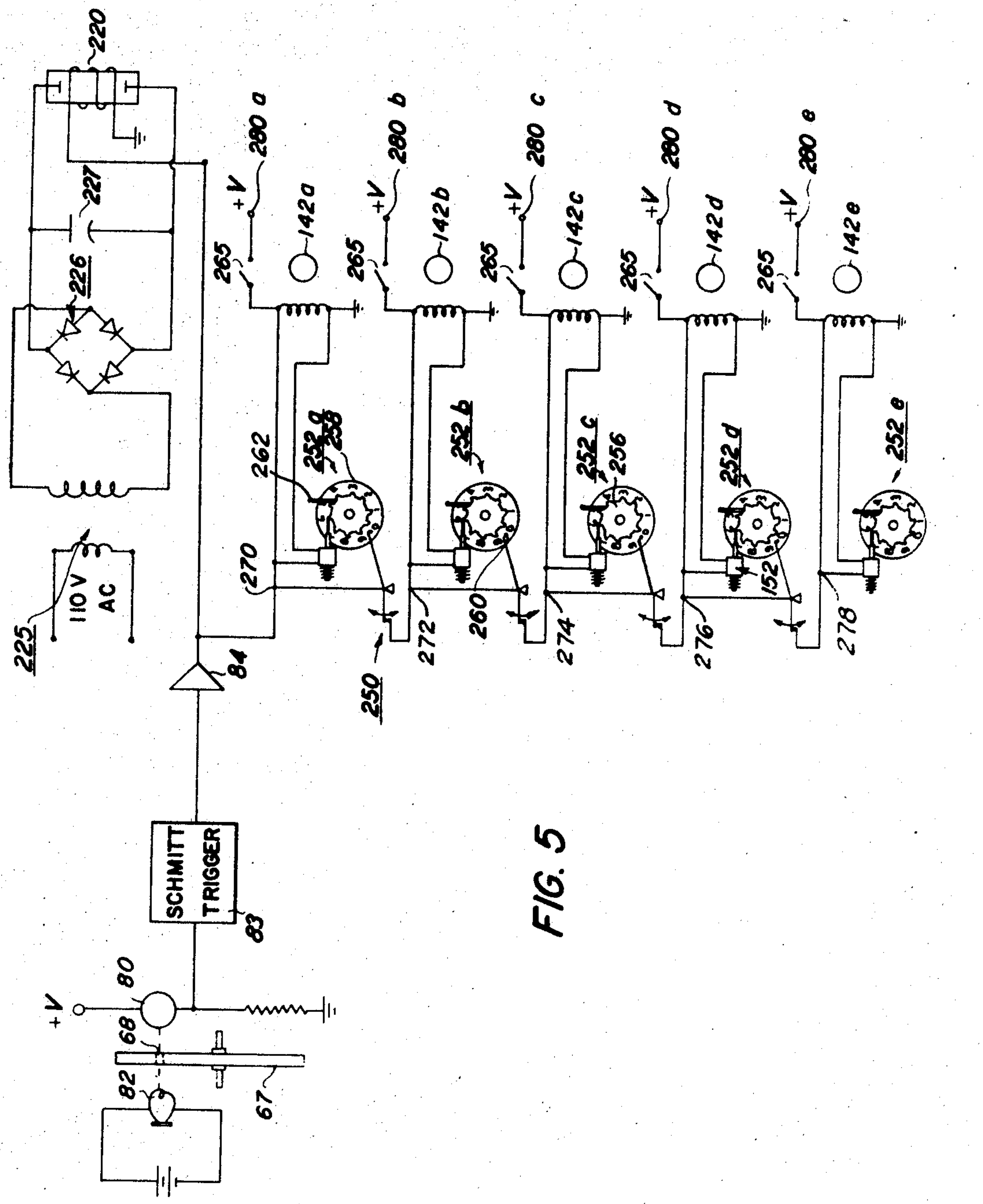
FIG. 5 is a schematic wiring diagram for a preferred embodiment of the character generator.

For the embodiment described when used in conjunction with the particular titling system illustrated in FIG. 1, the operation of character generator 12 is best understood in connection with the schematic wiring diagram of FIG. 5. Timed electrical pulses are generated upon impingement on photocell 80 by illumination from lamp 82 through apertures 68 in timing disc 67. After passing through a Schmitt trigger 83 for squaring the pulses are transmitted to a power driver 84 which triggers both flash lamp 118 and advances motors **142*a*, 142*b*, 142*c*, 142*d*, and 142*e* serially and simultaneously in counter-like sequence as will be understood. The short duration flash occurs momentarily before actuation of the drive motors, allowing titling numerals 115** to be imaged just prior to advance to the next position.

The triggering pulse for the lamp 118 is passed through a coil 220 causing gas within the lamp to ionize resulting in a flash discharge between the lamp terminals. The lamp is continuously biased by a high voltage supply consisting of 110 volt AC input, high voltage transformer 225, rectifier 226 and capacitor 227.

Electrical pulses are transmitted to drive motors 142 *a* through *e* in a predetermined manner to illuminate the correct numerals 115 at the proper time. To accomplish this, motors **142*a*** through *e* are connected in parallel and also in series via decade counter switches 250. Switches 250 are normally in the "open" position; hence, only the "units" drive or motor **142*a* receives every pulse transmitted. To actuate the switches in counter sequence are actuators 252*a*, 252*b*, 252*c*, 252*d*, and 252*e* which correspond in number to the loop drive motors and are connected across the same terminals in parallel with their associated loop drive motor. Actuators 252a** through *e* are solenoid actuated and drive a cogged wheel 256 mounted for rotation on the same shaft with a disc 258 such that a complete revolution of the cogged wheel and disc represent an advance of the corresponding film loop 102 through its numeral "9." When this occurs a pin 260 on disc 258 pivots its associated switch 250 about a fulcrum 261 from the "open" position to the closed "position" to conduct the next pulse to the adjacent film loop drive motor. Cogged wheels 256 are prevented from advancing more than one cog at a time or from freely spinning by the action of a leaf spring 262 which engages the cogs. Any suitable counter switch may be used as, for example, that manufactured by Presin, Inc., Bridgeport, Conn.

To understand more fully, terminal 270 is connected across the "units" digit or film loop drive motor 142a and associated counter actuator 252a. In similar fashion terminal 272 represents the "tens" digit, terminal 274 the "hundreds" digit, terminal 276 "the thousandths" digit and terminal 278 the "ten thousandths" digit. When motor 142a advances the "units" digit film loop 102 past numeral 9 there is a corresponding drive sequence of counter actuator 252a to rotate cogged wheel 256 a complete revolution. When this occurs the associated switch 250 closes. On the next pulse drive motor 142b is energized simultaneously with drive motor 142a and these film loops are advanced one character for both the "units" and "tens" digits. The operation is similar for the remainder of the film loop digits so as to operate in decade counter fashion. Motors 142a through *e* are coupled to terminals 280a through *e*, respectively, via normally open switches 265. Upon closing switches 265 in digital sequence the counter can be zeroized or preset to any position in short order.

Above is described a character generator for imaging at a high level of illumination and readability onto a photoconductive member or the like. With the unique structure disclosed the character generator generates high quality images continuously and operates as a decade counter as well. In this manner continuous images are furnished for titling web materials, such as microfilm. Furthermore, the selective operation of the character generator with advancement of the microfilm web enables proper registration to be had between the images recorded and film frames on the microfilm web. Hence titling can be effected with simplicity both rapidly and accurately.

Since many changes could be made in the above construction and many apparently widely different embodiments of this invention could be made without departing from the scope thereof it is intended that all matter contained in the drawings and specification shall be interpreted as illustrative and not in a limiting sense.

What is claimed is:

1. In a xerographic apparatus in which optically projected character information is to be xerographically recorded onto predefined areas of a continuously advancing microfilm web, a character generator comprising in combination:

a plurality of endless imaging loops each containing a plurality of optically projectable image characters;

means to support said loops juxtaposed for movement in parallel paths relative to exposure station defined linearly extending transverse to the loop paths;

lamp means adapted for high intensity short duration illumination disposed centrally through said film loops generally coextensive with said exposure station;

drive means operatively connected separately to each imaging loop and adapted when energized to advance a portion of predetermined individual ones of said loops simultaneously to said exposure station to effect a progressive sequence of character information to be projected;

a photoconductive member positioned in the optical path of character information projected to record corresponding latent images thereon;

transport means for advancing a web containing prearranged marking areas in contact with said photoconductive member to receive said images after development thereof;

circuit means responsive to the web advance for energizing said lamp means and said drive means in timed relation to each other to project sequentially changing characters onto said photoconductive member at the exposure station in synchronization with the advancing prearranged marking areas on said web.

2. Apparatus according to claim 1 wherein said drive means comprises individual motor drives for advancing an associated loop, each of said motor drives being enclosed at least partially within an end portion of its respective loop.

3. Apparatus according to claim 1 wherein said optically projectable characters comprise numerals "0" through "9" occupying substantially the total width of said loops to present a maximum coverage aspect relative to the exposure area at said exposure station.

4. Apparatus according to claim 1 wherein said photoconductive member comprises a drum adapted for rotation past a series of radially disposed xerographic processing stations for recording information continuously.

5. A character generator apparatus comprising in combination:

a plurality of endless film loops each containing a plurality of optically projectable image characters;

means to support said loops juxtaposed for movement in parallel paths past an exposure station defined linearly extending transverse thereto;

lamp means adapted for high intensity short duration illumination disposed centrally through said film loops generally coextensive with said exposure station;

drive means operatively connected separately to each imaging loop and adapted when energized to advance a portion of predetermined individual ones of said loops simultaneously to said exposure station to effect a progressive sequence of character information to be projected;

said drive means comprising individual motor drives for advancing an associated loop, each of said motor drives being enclosed at least partially within an end portion of its respective loop;

sleeve means to enclose an interior portion of each loop at the opposite end from its associated motor drive to form with each loop and its motor drive separate chambers at the ends thereof, conduits extending transversely through said loops, said conduits being connected to a source of pressurized air and having spaced apertures therein aligned with and directed toward said chambers to provide communication between said source of pressurized air and said chambers; and circuit means for energizing said lamp means and said drive means in timed relation to each other to project sequentially changing characters from said loops toward an imaging plane.

6. A character generator apparatus comprising in combination:

a plurality of endless film loops each containing a plurality of optically projectable image characters;

means to support said loops juxtaposed for movement in parallel paths past an exposure station defined linearly extending transverse thereto;

lamp means adapted for high intensity short duration illumination disposed centrally through said film loops generally coextensive with said exposure station;

drive means operatively connected separately to each imaging loop and adapted when energized to advance a portion of predetermined individual ones of said loops simultaneously to said exposure station to effect a progressive sequence of character information to be projected;

said drive means comprising individual motor drives for advancing an associated loop, each of said motor drives being enclosed at least partially within an end portion of its respective loop;

sleeve means to enclose an interior portion of each loop at the opposite end from its associated motor drive to form with each loop and its motor drive separate chambers at the ends thereof, conduits extending transversely through said loops, said conduits being connected to a source of pressurized air and having spaced apertures therein aligned with and directed toward said chambers to provide communication between said source of pressurized air and said chambers;

each said chamber containing side walls comprises parallel spaced apart bracket members having openings therethrough to receive said motor drives and sleeve means, and a lubricating fin member shaped as a loop end secured to each bracket;

and circuit means for energizing said lamp means and said drive means in timed relation to each other to project sequentially changing characters from said loops toward an imaging plane.

7. In a xerographic apparatus in which optically projected character information is to be xerographically recorded onto predefined areas of a continuously advancing microfilm web, a character generator comprising in combination:

a plurality of endless imaging loops each containing a plurality of optically projectable image characters;

means to support said loops juxtaposed for movement in parallel paths relative to exosure station defined linearly extending transverse to the loop paths;

lamp means adapted for high intensity short duration illumination disposed centrally through said film loops generally coextensive with said exposure station;

drive means operatively connected separately to each imaging loop and adapted when energized to advance a portion of predetermined individual ones of said loops simultaneously to said exposure station to effect a progressive sequence of character information to be projected;

a photoconductive member positioned in the optical path of character information projected to record corresponding latent images thereon;

transport means for advancing a web containing prearranged marking areas in contact with said photoconductive member to receive said images after development thereof;

circuit means responsive to the web advance for energizing said lamp means and said drive means in timed relation to each other to project sequentially changing characters onto said photoconductive member at the exposure station in synchronization with the advancing prearranged marking areas on said web; and said circuit means includes a lamp and photocell positioned on each side of a disc driven by said transport means and containing radially spaced apertures corresponding to the spacing between the marking areas on said web, said photocell being responsive to light from said lamp passing through said radially spaced apertures to emit discrete signals for the energization of said lamp means and said drive means.

References Cited

UNITED STATES PATENTS

| | | | |
|---|---|---|---|
| 3,120,790 | 2/1964 | Carlson | 95—1.7 |
| 3,263,581 | 8/1966 | Linderman | 95—1.1 |
| 3,291,015 | 12/1966 | Moyroud | 95—4.5 |

JOHN M. HORAN, Primary Examiner

U.S. Cl. X.R.

355—13, 40